United States Patent
Tiwari et al.

(10) Patent No.: US 8,423,068 B2
(45) Date of Patent: Apr. 16, 2013

(54) QUALITY OF SERVICE BASED MULTI-ANTENNA MODE SWITCHING

(75) Inventors: Swati Tiwari, Austin, TX (US); Krishna D. Sitaram, Chantilly, VA (US); Hemanth Balaji Pawar, Herndon, VA (US); Jong-hak Jung, Herndon, VA (US); Esmail Hejazi Dinan, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 663 days.

(21) Appl. No.: 12/369,880

(22) Filed: Feb. 12, 2009

(65) Prior Publication Data
US 2010/0203916 A1 Aug. 12, 2010

(51) Int. Cl.
*H04B 7/00* (2006.01)

(52) U.S. Cl.
USPC ............................. 455/513; 455/453; 455/512

(58) Field of Classification Search .......... 455/512–513, 455/453
See application file for complete search history.

(56) References Cited

U.S. PATENT DOCUMENTS

| 7,315,744 | B2* | 1/2008 | Achour .................. 455/453 |
| 2005/0281189 | A1 | 12/2005 | Lee et al. |
| 2006/0014544 | A1* | 1/2006 | Tolli .................... 455/453 |
| 2006/0121946 | A1 | 6/2006 | Walton et al. |
| 2006/0146755 | A1 | 7/2006 | Pan et al. |
| 2009/0163223 | A1* | 6/2009 | Casey ................. 455/453 |
| 2010/0136998 | A1* | 6/2010 | Lott et al. ............ 455/453 |
| 2010/0144365 | A1* | 6/2010 | Pan et al. ............ 455/453 |
| 2011/0243100 | A1* | 10/2011 | Ball et al. ............ 370/335 |

* cited by examiner

*Primary Examiner* — James H Cho
(74) *Attorney, Agent, or Firm* — O'Brien Jones, PLLC (57) ABSTRACT

A method of operating a communication system is disclosed. A first wireless device associated with a first profile is communicated with using a first multi-antenna mode. A second wireless device associated with a second profile is communicated with using the first multi-antenna mode. A network resource utilization is determined. It is determined that the network resource utilization satisfies a criteria. Based on the network resource utilization satisfying the criteria, at least one control message is sent that instructs the second wireless device to use a second multi-antenna mode.

19 Claims, 5 Drawing Sheets

QUALITY OF SERVICE BASED MULTI-ANTENNA MODE SWITCHING

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of operating a communication system is disclosed. A first wireless device associated with a first profile is communicated with using a first multi-antenna mode. A second wireless device associated with a second profile is communicated with using the first multi-antenna mode. A network resource utilization is determined. It is determined that the network resource utilization satisfies a criteria. Based on the network resource utilization satisfying the criteria, at least one control message is sent that instructs the second wireless device to use a second multi-antenna mode.

Wireless communication is received from a first plurality of wireless devices that are operating using a first multi-antenna mode. The first plurality of devices are associated with a first quality of service. Wireless communication is received from a second plurality of wireless devices that are operating using the first multi-antenna mode. The second plurality of wireless devices are associated with a second quality of service. A network resource utilization associated with the first plurality of wireless devices is determined. Based on the network resource utilization satisfying a criteria, at least one message is sent to at least one of the second plurality of wireless devices that the at least one of the second plurality of wireless devices is to switch to a second multi-antenna mode.

A communication system is disclosed. A wireless station communicates, using a first multi-antenna mode, with a first plurality of wireless devices associated with a first quality of service, and with a second plurality of wireless devices associated with a second quality of service. The communication system determines that a network resource utilization associated with the first plurality of wireless devices satisfies a criteria. Based on that determination, the wireless station sends at least one message to at least one of the second plurality of wireless devices that the at least one of the second plurality of wireless devices is to switch to a second multi-antenna mode.

DETAILED DESCRIPTION

In an embodiment, a communication system determines the total loading of a base station. The total loading may correspond to the total number of time and frequency allocations (slots) utilized. The load attributed to various user profiles is determined. User profiles may be service flow classification based (e.g., unsolicited grant service, best efforts, and so on.) or subscriber based (e.g., gold, silver, bronze, etc.).

If the load attributed to higher priority profile users exceeds a threshold, then the communication system takes steps to move one or more low priority profile users from a lower bandwidth multi-antenna mode (e.g., space-time coding a.k.a. STC-MIMO) to a higher bandwidth multi-antenna mode (e.g., spatial multiplexing a.k.a. SM-MIMO) to free up capacity for higher priority users. Thus, communication system resources may be used more efficiently to provide more throughput to high priority profile users while maintaining some minimum throughput to lower priority profile users. Moving lower priority users to SM-MIMO is acceptable even though the carrier to interference and noise (CINR) conditions may have resulted in the selection of STC-MIMO because the increase in modulation and coding scheme (MCS) to low priority users frees up capacity for the high priority users to continue to use the more robust STC-MIMO.

Figure 1:
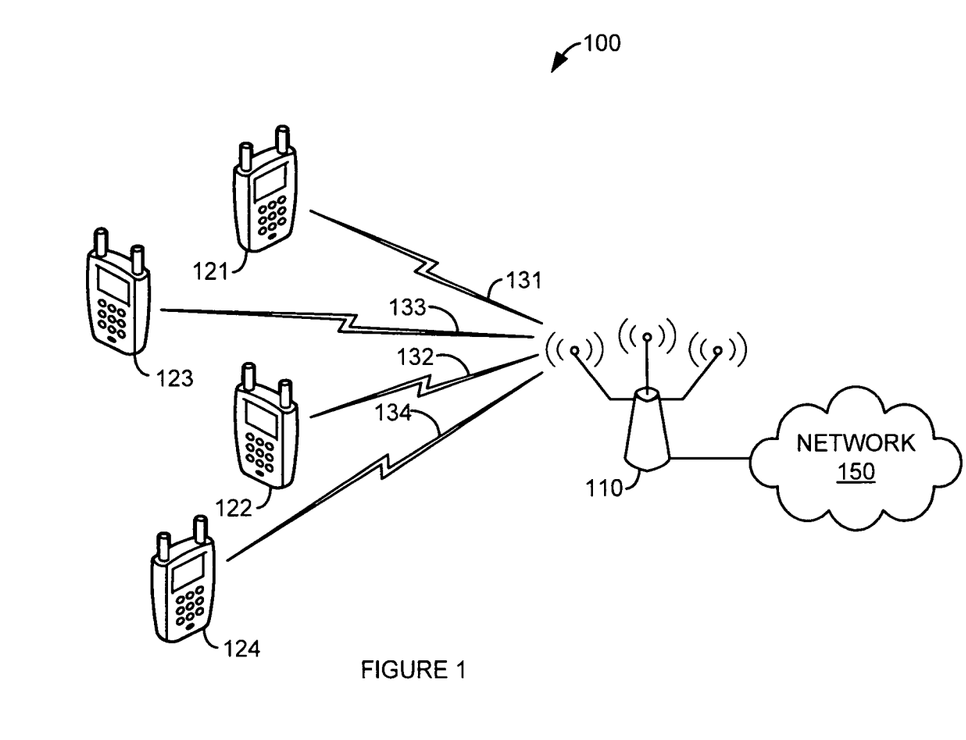
FIG. 1 is a block diagram illustrating a communication system.

FIG. 1 is a block diagram illustrating a communication system. In FIG. 1, communication system 100 comprises base station 110, wireless device 121, wireless device 122, wireless device 123, wireless device 124, and network 150. Base station 110 is operatively coupled to network 150. Wireless devices 121-124 are operatively coupled to base station 110 via wireless links 131-134, respectively. Thus, wireless devices 121-124 may be operatively coupled to network 150 via base station 110.

Base station 110 includes multiple antennas and multiple transmitters. Base station 110 may include multiple receivers. Wireless devices 121-124 may include multiple antennas, multiple receivers, and multiple transmitters.

Wireless devices 121-124 may be any device, system, combination of devices, or other such communication platform capable of communicating with base station 110 using multiple antennas. Wireless devices 121-124 may use communication aspects specified by the WiMAX specification including, but not limited to, the multiple-input multiple-output (MIMO) modes detailed therein. Wireless devices 121-124 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via multiple antennas. Other types of communication platforms are possible.

Wireless devices 121-124 may establish communication sessions with base station 110 in order to receive communication services from network 150. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

To receive one or more of these services, traffic flows may be exchanged with wireless devices 121-124 and base station 110. These traffic flows may have one or more service flow classifications. For example, base station 110 may exchange traffic flows with wireless device 121 that includes a service traffic flow classification for voice service, and a service traffic flow classification for a web browsing service. The service traffic flow classifications for voice service and for web browsing service may have different quality of service (QoS) requirements. In an embodiment, the traffic flows for these services have different service flow classifications.

In an embodiment, the service flow classifications may include wireless traffic classifications. For example, for WiMAX wireless communication there are wireless traffic quality of service classifications that include: unsolicited grant service (UGS), real time polling service (rtPS), extended real time polling service (ertPS), non-real time polling service (nRTPS), and best effort (BE).

Base station 110 may be any wireless system that provides the air interface to wireless devices 121-124 using multiple antennas. Base station 110 may also use one or more transmitters. Base station 110 may also use one or more receivers. Base station 110 may be any wireless system that can provide an air interface to wireless devices 121-124 using multiple antennas. Base station 110 may use communication aspects specified by the WiMAX specification including, but not limited to, the MIMO modes detailed therein. Examples of base stations that may be utilized include, base transceiver stations (BTSs), radio base stations (RBSs), Node B, enhanced Node B (eNBs) and others. Base station 110 may include a number of elements known to those skilled in the art comprising transceivers, power amplifiers, combiner, duplexer, and antennas. Base station 110 may include additional components such as a control function or control computer. However, these additional components have been omitted from FIG. 1 for the sake of brevity.

Network 150 may be any network or collection of networks that couple, link, or otherwise operatively connect base station 110 with other devices or systems. Network 150 may include other secondary data networks. In an example, network 150 may include a backhaul network, a local network, a long distance network, a packet network, the internet, or any combination thereof, as well as other types of networks.

In an example, network 150 may be, or include all or parts of an IEEE 802.16 (WiMAX) specified system. These parts may include additional base stations (BSs), an access services network (ASN), access services network gateway (ASN-GW), or connectivity service network (CSN).

In an embodiment, wireless devices 121-124 may be operated in M by N multiple-input multiple-output (MIMO) modes. M is the number of transmitters and/or antennas that base station 110 is using to transmit a data stream to a given wireless device 121-124. N is the number of receivers and/or antennas that a given wireless device 121-124 is using to receive a data stream from base station 110. In an embodiment, M and N may both be two (2). Thus, a given wireless devices 121-124 would be said to be operating in 2×2 MIMO mode. In another embodiment, M=1 and N=2. Thus, a given wireless device would be said to be operating in 1×2 MIMO mode.

In addition to MIMO modes that specify the number of transmitting and receiving antennas, there are MIMO modes that specify how the data stream is transmitted from the multiple transmitting antennas. A first MIMO mode splits a data stream into multiple lower rate data streams and each data stream is transmitted from a different transmit antenna of base station 110 in the same frequency channel. This mode may be referred to as spatial-multiplexing MIMO (SM-MIMO).

A second MIMO mode transmits multiple redundant copies of a single data stream. The single stream is coded using techniques called space-time coding. The single stream is emitted from each of the transmit antennas of base station 110 using certain principles of full or near orthogonal coding. This mode may be referred to as diversity coding MIMO or space-time coding MIMO (STC-MIMO). In a WiMAX specified system, STC-MIMO may be known as MIMO-A. SM-MIMO may be known as MIMO-B. STC-MIMO, SM-MIMO, along with other multi-antenna techniques where M>1 and N>=1 may be referred to collectively as multi-antenna modes.

Wireless devices 121-122 may be associated with a first profile. Wireless devices 123-124 may be associated with a second profile. For example, wireless devices 121 and 122 may be associated with a higher subscriber quality of service profile than wireless devices 123-124. In other words, communication system 100 may associate wireless devices 121 and 122 with a subscriber profile (e.g., "gold") that is designed to differentiate wireless devices 121 and 122 from wireless devices 122 and 124 which are associated with a lower quality of service subscriber profile (e.g., "silver" or "bronze").

In another example, wireless devices 121 and 122 may be associated with a higher service flow quality of service profile than wireless devices 123 and 124. In other words, service flow classifications (e.g., UGS or rtPS) that have higher priority may be associated with wireless devices 121 and 122 than service flow classifications associated with wireless devices 121 and 122 (e.g., nRTPS or BE).

Based on the aforementioned profiles, communication system 100 may undertake efforts to improve the quality of service provided to wireless devices associated with higher quality of service profiles (e.g., wireless devices 121 and 122) at the expense of wireless devices associated with lower quality of service profiles (e.g., wireless devices 123 and 124).

In an embodiment, base station 110 may communicate with wireless devices 121-124 using a first multi-antenna mode. For example, base station 110 may communicate with wireless devices 121-124 using STC-MIMO (i.e., MIMO-A). Communication system 100 may determine a network resource utilization. For example, communication system 100 may determine a maximum capacity of base station 110. The maximum capacity of base station 110 may correspond to the number of time and frequency allocation units (slots) available in a given frame. The maximum capacity of base station 110 may correspond to an average number of slots available over a series of frames.

Communication system 100 may determine a network resource utilization associated with one or more profiles. For example, communication system 100 may determine a total loading for each profile associated with a wireless device 121-124. The total loading for each profile may correspond to the number of slots used by all the wireless devices associated with a given profile. In other words, consider the case where wireless devices 121 and 122 are associated with a first profile, and wireless devices 123 and 124 are associated with a second profile. If wireless device 121 uses (or needs) 50 slots and wireless device 122 uses 30 slots, the total loading associated with the first profile is 80 slots. Likewise, if wireless device 123 uses 100 slots and wireless device 124 uses 15 slots, the total loading associated with the second profile is 115 slots. Other measures of loading may be used. For example, other measures of loading that may be used include the number of bits or bytes used, or a measure of throughput such as bits per second.

In an embodiment, as long as the network resource utilization associated with a higher priority (or quality of service) profile(s) remains below a threshold, communication system 100 may refrain from taking steps to improve the quality of service provided to the wireless devices associated with the higher priority profile(s). When communication system 100 determines that the network resource utilization associated with one or more profiles satisfies a criteria, communication system 100 may take steps to provide more network resources to the higher priority profiles. For example, when communication system 100 determines that the network resource utilization associated with one or more profiles exceeds a threshold percentage of the maximum capacity of base station 110, communication system 100 may take steps to provide more network resources to the higher priority profiles.

In an embodiment, communication system 100 may group wireless devices 121-124 according to their associated profile. For example, because wireless devices 121 and 122 are associated with a first profile, they would be placed in a first group. Because wireless devices 123 and 124 are associated with a second profile, they would be placed in a second group. These groups may then be ordered by priority. In other words, if the first profile had a higher priority than the second profile, then the second group may be selected before the first group for a reduction in quality of service.

Each wireless device 121-124 may be ordered within a group according to a signal quality indicator. For example, if wireless device 123 was associated with better RF conditions (according to the signal quality indicator) than wireless device 124, wireless device 123 would be ordered ahead of wireless device 124 for selection to receive a reduction in quality of service.

In an embodiment, a signal quality indicator may be based on a received signal strength indication (RSSI). In an embodiment, the signal quality indicator may be based on a carrier to interference and noise ration (CINR). In an embodiment, the signal quality indicator may be based on a channel quality indicator (CQI) received from one or more wireless devices 121-124.

In an embodiment, communication system 100 may select at least one wireless device 121-124 to switch multi-antenna modes. For example, communication system 100 may select wireless device 123 to switch multi-antenna modes. Thus, communication system 100 may send a control message to wireless device 123 instructing it to switch from MIMO-A to MIMO-B.

Communication system 100 may select wireless device 123 based on wireless device 123 being associated with a lower priority profile (e.g., the second profile discussed above) and also being associated with a signal quality indicator that exceeded a threshold. For example, communication system 100 may select wireless device 123 over wireless device 124 because the CINR associated with wireless device 123 exceeded a threshold whereas the CINR associated with wireless device 124 did not. In another example, communication system 100 may select wireless device 123 over wireless device 124 simply because the CINR associated with wireless device 123 was the best among the second profile wireless devices 123-124. Thus, when higher priority profile wireless devices (e.g., wireless devices 121-122) load base station 100 above a certain threshold, communication system 100 selects lower priority profile wireless device (e.g., wireless devices 123 and 124) for a relaxation of the signal quality required to cause a switch to a higher bandwidth multi-antenna mode (e.g., SM-MIMO).

In an embodiment, the signal quality indicator threshold may be statically configurable. For example, a CINR of 20 dB may be selected as the threshold above which a wireless device associated with the lower priority profile will be selected to switch multi-antenna modes. In another embodiment, the signal quality indicator threshold may adjust base on network resource loading. For example, a CINR of 20 dB may be selected when the total loading on base station 110 is 50% of capacity. A CINR of 18 dB may be selected when the total loading of base station 110 is 75% of capacity.

Figure 2:
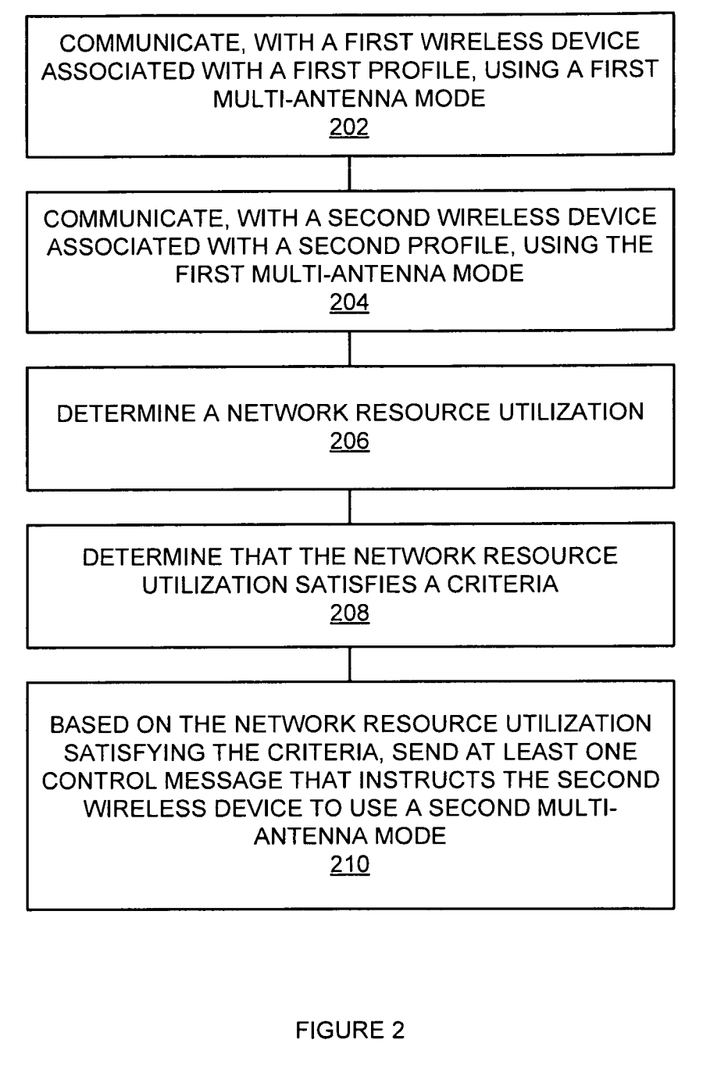
FIG. 2 is a flowchart illustrating a method of operating a communication system.

FIG. 2 is a flowchart illustrating a method of operating a communication system. The steps illustrated in FIG. 2 may be performed by one or more elements of communication system 100.

A first wireless device associated with a first profile is communicated with using a first multi-antenna mode (202). For example, wireless device 121 may be associated with a high priority profile. Base station 110 may communicate with wireless device 121 using MIMO-A. A second wireless device associated with a second profile is communicated with using the first multi-antenna mode (204). For example, wireless device 123 may be associated with a low priority profile. Base station 110 may communicate with wireless device 123 using MIMO-A.

A network resource utilization is determined (206). For example, communication system 100 may determine a network resource utilization associated with the high priority profile. The network utilization may correspond to the number (or percentage) of slots utilized (or needed) by high priority profile devices. It is determined that the network resource utilization satisfies a criteria (208). For example, communication system 100 may determine that the number of slots utilized by high priority profile devices has exceeded a threshold number (or percentage) of the maximum available slots.

Based on the network resource utilization satisfying the criteria, send at least one control message that instructs the second wireless device to use a second multi-antenna mode (210). For example, as a result of communication system 100 determining that the number of slots utilized by high priority profile devices has exceeded a threshold number (or percentage) of the maximum available slots, communication system 100 may send a message to wireless device 123 to switch to MIMO-B. Communication system 100 may select wireless device 123 to switch to MIMO-B based on a profile and a signal quality indicator associated with wireless device 123. Communication system 100 may select wireless device 123 to switch to MIMO-B because a signal quality indicator associated with wireless device 123 exceeds a threshold. The threshold that caused communication system 100 to select wireless device 123 may be less than a threshold that would cause higher priority profile devices to switch to MIMO-B.

Figure 3:
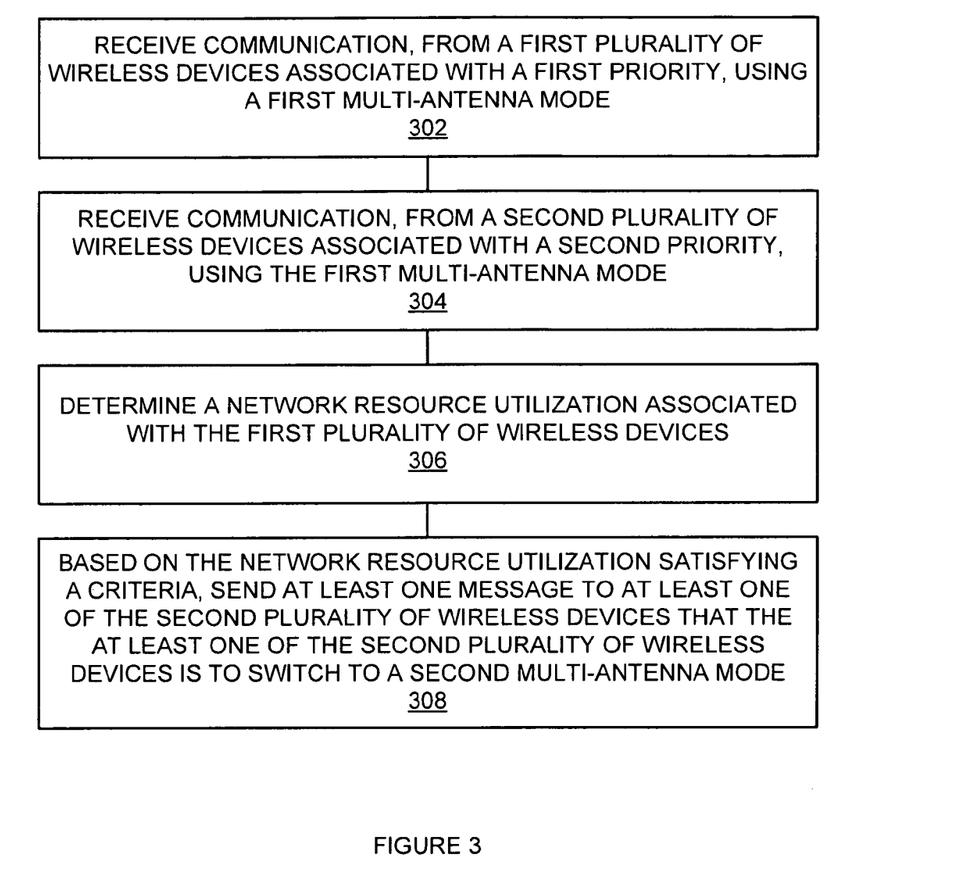
FIG. 3 is a flowchart illustrating a method of operating a communication system.

FIG. 3 is a flowchart illustrating a method of operating a communication system. The steps illustrated in FIG. 3 may be performed by one or more elements of communication system 100.

Communication, from a first plurality of devices associated with a first priority, is received, using a first multi-antenna mode (302). For example, base station 110 may communicate with wireless devices 121 and 122 using MIMO-A. Wireless devices 121 and 122 may be associated with a high priority profile. This high priority profile may be associated with a subscriber quality of service such a "gold", "silver", or "bronze." This high priority profile may be associated with a service flow classification quality of service such as UGS.

Communication, from a second plurality of devices associated with a second priority, is received, using a first multi-antenna mode (302). For example, base station 110 may communicate with wireless devices 123 and 124 using MIMO-A. Wireless devices 123 and 124 may be associated with a low priority profile. This low priority profile may be associated with a subscriber quality of service. This low priority profile may be associated with a service flow classification quality of service.

A network resource utilization associated with the first plurality of wireless devices is determined (306). For example, communication system 100 may determine that high priority profile wireless devices 121 and 122 are utilizing a certain number of slots per frame. This number of slots per frame may be an instantaneous value or an average. In another example, communication system 100 may determine that high priority profile wireless devices 121 and 122 are utilizing a certain percentage of a maximum number of slots per frame.

Based on the network resource utilization satisfying a criteria, at least one message is sent to at least one of the second plurality of wireless devices that the at least one of the second plurality of wireless devices is to switch to a second multi-antenna mode (308). For example, based on a percentage of a maximum number of slots per frame being utilized by wireless devices 121 and 122, communication system 100 may send a message to at least one of wireless devices 123 and 124 that at least one of wireless devices 123 and 124 is to switch to MIMO-B. In another example, based on the percentage of a maximum number of slots per frame being utilized by wireless devices 121 and 122, and a signal quality indicator, such as CINR, exceeding a threshold, communication system 100 may send a message to wireless device 123 that wireless device 123 is to switch to MIMO-B.

Figure 4:
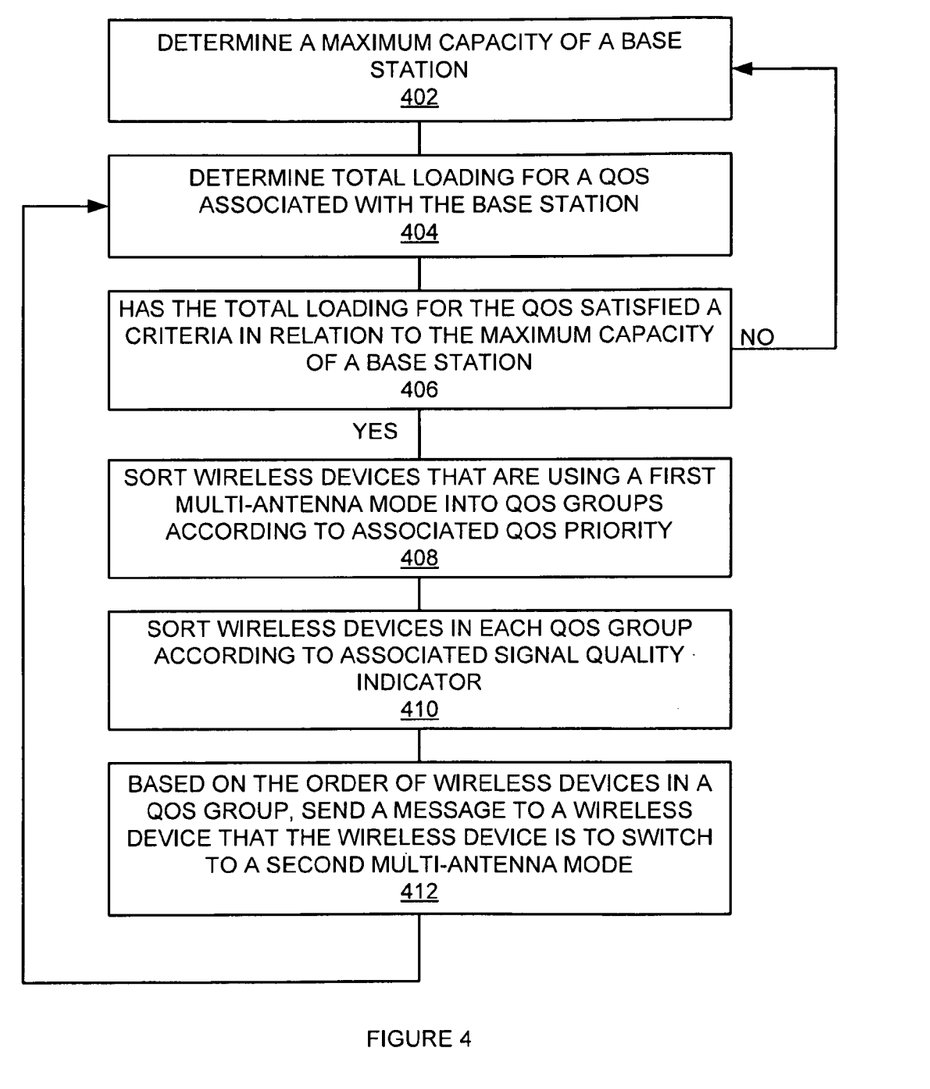
FIG. 4 is a flowchart illustrating a method of operating a base station to control multi-antenna modes.

FIG. 4 is a flowchart illustrating a method of operating a base station to control multi-antenna modes. The steps illustrated in FIG. 4 may be performed by one or more elements of communication system 100.

A maximum capacity of a base station is determined (402). For example, communication system 100 may determine the maximum available number of slots in a frame that would correspond to a full frame. A total loading is determined for a QoS associated with the base station (404). For example, the number of slots utilized by wireless devices 121 and 122 that are communicating with base station 110 may be determined. Wireless devices 121 and 122 may be associated with a high QoS. Wireless devices 123 and 124 may be associated with a low QoS.

If the total loading for the QoS does not satisfy a criteria in relation to the maximum capacity of the base station, flow proceeds back to block 402. If the total loading for the QoS satisfies the criteria in relation to the maximum capacity of the base station, flow proceeds to block 408 (406). For example, if the number of slots utilized by wireless devices 121 and 122 does not exceed a threshold percentage of the maximum number of available slots in a frame as determined in block 402, then flow would proceed back to block 402. If the number of slots utilized by wireless devices 121 and 122 exceeds a threshold percentage of the maximum number of available slots in a frame as determined in block 402, then flow proceeds to block 408.

Wireless devices that are using a first multi-antenna mode are sorted into QoS groups according to associated QoS priority (408). For example, wireless devices 121-124, which are all using MIMO-A, may be sorted into a high QoS priority group and a low QoS priority group. Thus, wireless devices 121 and 122 would be sorted into the high QoS priority group. Wireless devices 123 and 124 would be sorted into the low QoS priority group.

Wireless devices in each QoS group are sorted according to an associated signal quality indicator (410). For example, wireless devices 123 and 124 would be sorted within the low QoS priority group by a signal quality indicator such as CINR. Thus, wireless devices 123 and 124 would be ordered within the low QoS priority group according to the RF conditions each wireless device 123 and 124 is experiencing.

Based on the order of wireless devices in a QoS group, send a message to a wireless device that the wireless device is to switch to a second multi-antenna mode (412). For example, consider a case where wireless device 123 is ordered ahead of wireless device 124 in the low QoS priority group. Based on this ordering, communication system 100 may send a message to wireless device 123, and not wireless device 124, to switch from MIMO-A to MIMO-B. In another example, based on this ordering, communication system 100 may send a message to the top N wireless devices in the low QoS priority group to switch from MIMO-A to MIMO-B, where N is an arbitrary integer. N may be selected such that the N devices that are switched from MIMO-A to MIMO-B all exceed a CINR threshold value. This threshold CINR value may be configured dynamically, or may be based on the total loading determined in block 404.

The methods, systems, networks, devices and base stations described above may be implemented with, contain, or be executed by one or more computer systems. The methods described above may also be stored on a computer readable medium. Many of the elements of communication network 100 may be, comprise, or include computers systems. This includes, but is not limited to communication system 100, base station 110, wireless device 121, wireless device 122, wireless device 123, wireless device 124, and network 150.

Figure 5:
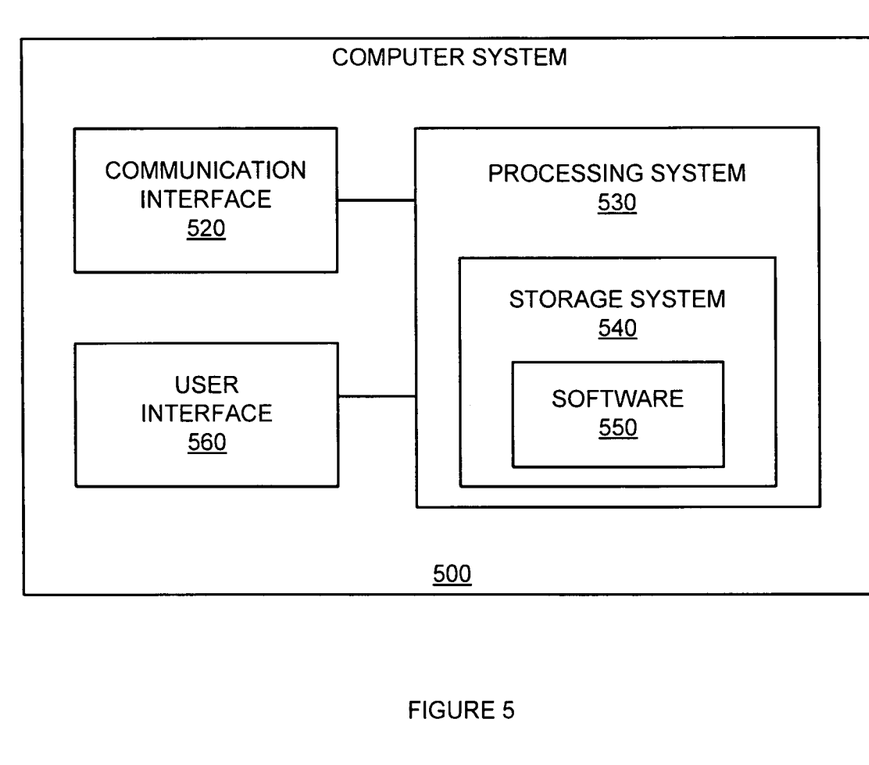
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   communicating by an access node with a first wireless device associated with a first profile using a first lower bandwidth multi-antenna mode;
   communicating by the access node with a second wireless device associated with a second profile using the first lower bandwidth multi-antenna mode;
   determining a network resource utilization;
   determining a second network resource utilization associated with a plurality of wireless devices;
   determining that the network resource utilization satisfies a criteria based on a relationship between the network resource utilization and the second network resource utilization; and,
   based on the network resource utilization satisfying the criteria, sending at least one control message that instructs the second wireless device to use a second higher bandwidth multi-antenna mode.

2. The method of claim 1, further comprising:
   after sending the at least one control message, communicating with the second wireless device by the access node using the second multi-antenna mode.

3. The method of claim 1, wherein the first profile is associated with a first quality of service to be provided to the first wireless device.

4. The method of claim 1, wherein the first profile is associated with a first quality of service to be provided to a first service flow being communicated with said first wireless device.

5. The method of claim 1, wherein the sending the at least one control message is further based on a signal quality indicator associated with the second wireless device satisfying a signal quality criteria.

6. The method of claim 5, wherein the signal quality indicator is based on a signal to noise ratio.

7. The method of claim 5, wherein the signal quality criteria is based on the network resource utilization.

8. A method of operating a communication system, comprising:
   receiving wireless communication at an access node from a first plurality of wireless devices that are operating using a first lower bandwidth multi-antenna mode, the first plurality of devices being associated with a first quality of service;
   receiving wireless communication at the access node from a second plurality of wireless devices that are operating using the first lower bandwidth multi-antenna mode, the second plurality of wireless devices being associated with a second quality of service;
   determining a network resource utilization associated with the first plurality of wireless devices; and,
   based on the network resource utilization satisfying a criteria, sending at least one message to at least one of the second plurality of wireless devices that the at least one of the second plurality of wireless devices is to switch to a second higher bandwidth multi-antenna mode.

9. The method of claim 8, further comprising:
   receiving wireless communication at the access node from the at least one of the second plurality of wireless devices using the second higher bandwidth multi-antenna mode.

10. The method of claim 8, wherein the first quality of service is associated with a first service flow classification.

11. The method of claim 8, wherein the sending at least one message to at least one of the second plurality of wireless devices is further based on signal quality indicators associated with the at least one of the second plurality of wireless devices.

12. The method of claim 11, wherein the sending at least one message to at least one of the second plurality of wireless devices is further based on signal quality indicators associated with the at least one of the second plurality of wireless devices satisfying a signal quality criteria.

13. The method of claim 12, wherein the signal quality criteria is based on an indicator of a signal to noise ratio associated with the at least one of the second plurality of wireless devices.

14. The method of claim 13, wherein the signal quality criteria is further based on the network resource utilization.

15. A communication system, comprising:
   a wireless station that communicates, using a first lower bandwidth multi-antenna mode, with a first plurality of wireless devices associated with a first quality of service, and with a second plurality of wireless devices associated with a second quality of service; and,
   the communication system determining that a network resource utilization associated with the first plurality of wireless devices satisfies a criteria, and based on the determination the wireless station sends at least one message to at least one of the second plurality of wireless devices that the at least one of the second plurality of wireless devices is to switch to a second higher bandwidth multi-antenna mode to communicate with the wireless station.

16. The system of claim 15, wherein the first quality of service is associated with a first service flow classification.

17. The system of claim 15, wherein the sending at least one message to at least one of the second plurality of wireless devices is further based on signal quality indicators associated with the at least one of the second plurality of wireless devices.

18. The system of claim 17, wherein the signal quality criteria is based on an indicator of a signal to noise ratio associated with the at least one of the second plurality of wireless devices.

19. The system of claim 18, wherein the signal quality criteria is further based on the network resource utilization.

* * * * *